US00RE37688E

(19) United States
(12) Reissued Patent
Vilims

(10) Patent Number: US RE37,688 E
(45) **Date of Reissued Patent: *May 7, 2002**

(54) PICTURE/POSTER FRAME ASSEMBLY AND RETAINER FOR HOLDING COMPONENTS IN THE FRAME OF THE ASSEMBLY

(75) Inventor: Daniel E. Vilims, Downers Grove, IL (US)

(73) Assignee: Terry Rozdolsky, Elk Grove Village, IL (US)

( * ) Notice: This patent is subject to a terminal disclaimer.

(21) Appl. No.: 08/622,895

(22) PCT Filed: Jun. 8, 1990

(86) PCT No.: PCT/US90/03291

§ 371 Date: Jun. 21, 1991

§ 102(e) Date: Jun. 21, 1991

(87) PCT Pub. No.: WO90/15560

PCT Pub. Date: Dec. 27, 1990

Related U.S. Patent Documents

Reissue of:

(64) Patent No.: 5,199,201
Issued: Apr. 6, 1993
Appl. No.: 07/691,042
Filed: Jun. 21, 1991

U.S. Applications:

(63) Continuation of application No. 08/174,876, filed on Dec. 28, 1993, now abandoned.

(51) Int. Cl.[7] ..... A47G 1/06
(52) U.S. Cl. ..... 40/792; 40/757
(58) Field of Search ..... 40/790, 792, 757

(56) References Cited

U.S. PATENT DOCUMENTS 2,581,843 A 1/1952 Edwards ..... 40/156

(List continued on next page.)

FOREIGN PATENT DOCUMENTS

DE 2225940 12/1973

(List continued on next page.)

*Primary Examiner*—Kenneth J. Dorner
*Assistant Examiner*—Cassandra Davis
(74) *Attorney, Agent, or Firm*—Thomas R. Vigil

(57) ABSTRACT

[The picture frame assembly includes a picture frame which has, in cross-section, a side wall, a turned in flange at the rear end of the side wall extending forwardly to a free end and a rearwardly extending flange at the front end of the side wall which provides a forward locator slot between the rearwardly extending flange and the side wall. The frame assembly also includes two or more retainer members. Each retainer member includes a generally U or V shaped retainer clip having an inner linear/planar leg portion having a flange extending laterally outwardly therefrom. A bight portion extends from the inner leg portion at an angle thereto, and an outer leg portion extends in a non-linear/non-planar manner to an outer end hook formation. The laterally extending flange of the clip member is received in the locator slot and the hook formation has a groove which is adapted to receive the free end of the short flange extending forwardly from the side wall toward the picture in the picture frame. The outer areal surface is of sufficient areal extent to provide support to the picture frame and engaging means, such as an adhesive, are combined with, or provided on, said outer areal surface for grippingly engaging the planar leg portion to a backing surface of a backing panel.] *The retainer clip is adapted to be positioned between an inwardly extending flange at the back of a picture frame and backing material located within the frame behind a picture in the frame. The retainer clip includes a resilient body, structure on the body for engaging the inwardly extending flange at the rear edge of the picture frame and structure on the body for engaging the backing material. The structure for engaging the backing material includes at least one prong, detent or barb positioned to engage the backing material.*

CORRECTED PATENT
(15) Correction Information:
Corrected Version No. 1 of 5,799,431
See INID code (10), patent number and kind code
Publication Date of Original Version: Sept. 1, 1998.

12 Claims, 4 Drawing Sheets

U.S. PATENT DOCUMENTS

| | | | | | |
|---|---|---|---|---|---|
| 3,899,844 | A | | 8/1975 | Munn | 40/156 |
| 4,037,342 | A | * | 7/1977 | Bott | 40/156 |
| 4,219,949 | A | | 9/1980 | McGurk | |
| 4,356,648 | A | | 11/1982 | Beaulieu | 40/156 |
| 4,516,342 | A | | 5/1985 | Reim | 40/156 |
| 4,790,089 | A | | 12/1988 | Astolfi | |
| 4,802,294 | A | | 2/1989 | Baus | 40/155 |
| 4,998,363 | A | * | 3/1991 | Villims | 40/792 |

FOREIGN PATENT DOCUMENTS

| | | | |
|---|---|---|---|
| DE | 2637144 | | 3/1977 |
| DE | 3434719 | | 10/1985 |
| FR | 2305153 | * | 11/1976 |
| FR | 7509724 | | 11/1976 |
| GB | 2057870 | | 8/1979 |
| GB | 2095990 | * | 10/1982 |

* cited by examiner

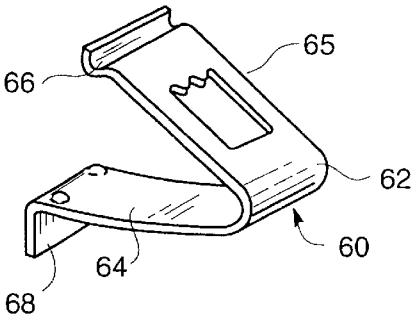
FIG. 2 - PRIOR ART
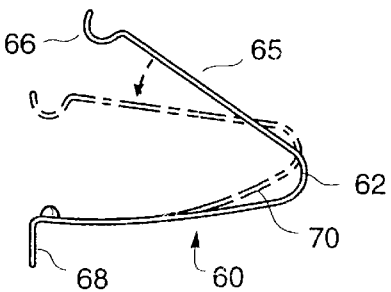
FIG. 3 - PRIOR ART
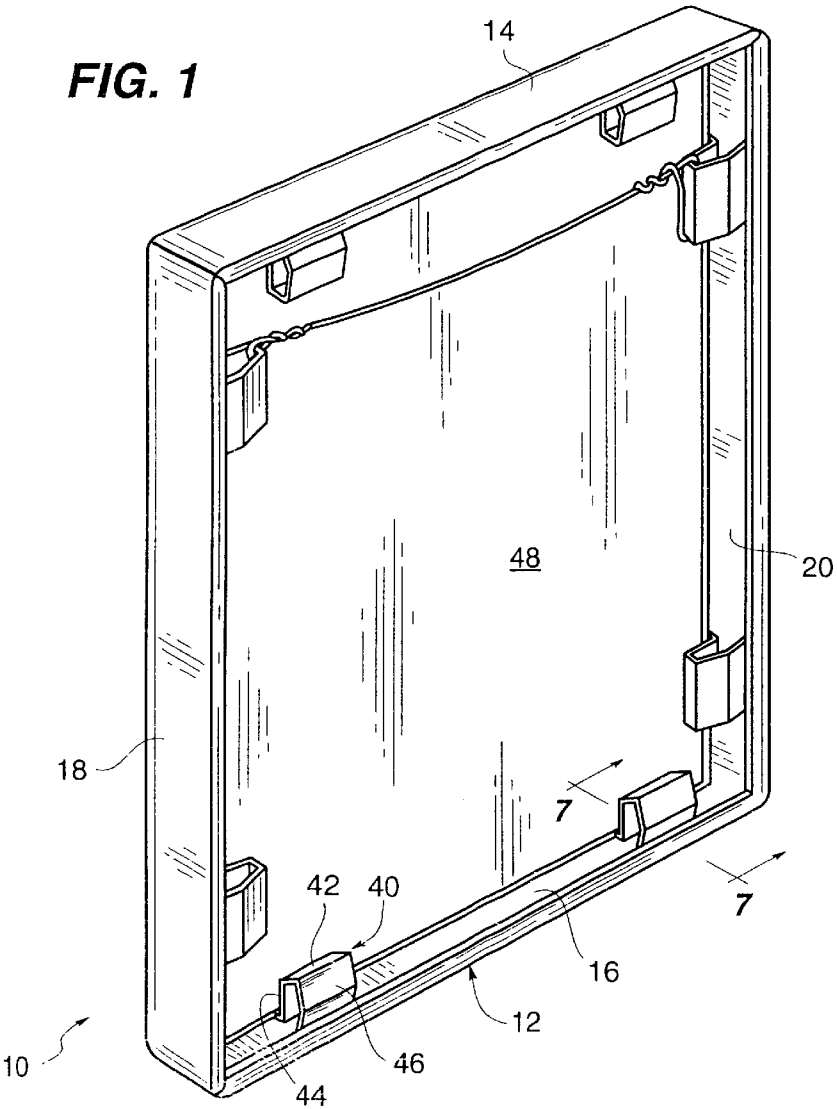
FIG. 1

PICTURE/POSTER FRAME ASSEMBLY AND RETAINER FOR HOLDING COMPONENTS IN THE FRAME OF THE ASSEMBLY

Matter enclosed in heavy brackets [ ] appears in the original patent but forms no part of this reissue specification; matter printed in italics indicates the additions made by reissue.

*This is a continuation of application Ser. No. 08/174,876 filed on Dec. 28, 1993 now abandoned.*

BACKGROUND OF THE INVENTION

1. Field of the Invention

The present invention relates to a picture frame assembly and a retainer for holding a picture in the frame of the assembly. More specifically, the present invention relates to a retainer which has a large areal surface and an adhesive on that areal surface for adhering to a backing sheet within the frame assembly. The present invention also relates to a picture frame assembly which includes a frame, glass or plastic sheet, a very rigid, double faced corrugated board backing sheet and two or more of the retainers adhered thereto and fixed within the frame for holding the components firmly against the frame surface thereby providing a one piece construction which will allow the frame assembly to be held in place on a wall without distortion of the top, bottom or side walls of the picture frame when hung on nails, hanging wire or other picture hanging hardware.

2. Description of the Prior Art

Heretofore a number of picture frame assemblies have been proposed including a picture frame that is made from an extruded metal, such as aluminum, and which has cutouts in the extrusion such that the extrusion can be folded to a rectangle to form a frame.

Furthermore, it has been proposed to provide clips for engaging the frame and bearing against the backing sheet for the picture mounted thereon which is positioned within the frame. A typical prior art clip is shown in FIGS. 2 and 3 of the drawings forming part of this patent application.

A recent example of a prior art picture frame is disclosed in U.S. Pat. No. 4,790,089. This patent discloses a picture frame including a framework, a support plane on which the image is placed, a transparent plane and blocking elements independent of the framework which interact with the framework and the supporting plane to hold the support plane and the picture in place within the framework.

A major on going "concern" in the picture frame industry is the lack of acceptable [rigidly] *rigidity* for wood, plastic and metal frames of thin cross-section. This inherent design problem is most apparent in frame sizes of over 16"×20" since the weight of the glass and the extended "beam" of the frame contribute to a noticeable "bow" when the frame assembly is suspended from the top horizontal frame member by nails. In severe cases, the frame deflection results in a dislodgement of the glass with resultant glass breakage and hazard to the user.

Many design approaches have been used to rectify this condition and include the following design approaches:

Gluing the glass to the frame profile.

Stapling the back to the frame profile for wood and plastic frames.

Use of support "strapping" (belly bands) stapled to the back side of the frame profile for wood and plastic frames.

Use of paper "dust covers" glued to the back of the frame profile.

The retainer and picture frame assembly of the present invention differ from the prior art retainers and picture frame assemblies by providing a retainer which has a large areal surface area on a side of the retainer facing a backing panel or sheet and a double sided adhesive tape on that surface which is adhered to both the retainer and the backing panel of the picture frame assembly. The retainer has preset corners or edges forming bend lines whereby the large areal surface area with or without an adhesive thereon is held firmly (flush) against the back side of the backing panel.

Further, the picture frame assembly of the present invention differs from prior picture frame assemblies by providing a picture frame assembly including not only the retainer described above but also a backing panel made of thin double faced corrugated board whereby when an adhesive is provided between the areal flat outer surface of the retainer and the backing panel, the weight of the picture frame assembly is supported not only by the frame but also by the backing panel and the picture mounted thereon such that the weight/load is distributed throughout the picture frame assembly.

SUMMARY OF THE INVENTION

According to the present invention there is provided a [picture frame assembly including a picture frame and backing panel mounted therein which picture frame has, in crosssection, a side wall, a turned in short flange at the rear end of the side wall extending forwardly to a free end, a rearwardly extending flange at the front end of the side wall providing a forward locator slot between the rearwardly extending flange and the side wall, said frame assembly including two or more retainer members, each retainer member including a generally U or V shaped retainer clip having an inner linear/planar leg portion having an outer areal surface adapted to abut and be adjacent to a portion of the back surface of said backing panel, and having a flange extending laterally outwardly therefrom, a bight portion extending from said inner leg portion at an angle thereto, and an outer leg portion which extends in a non-linear/non-planar manner to an outer end housing a hook formation, and means for grippingly engaging said outer areal surface of said inner leg portion of said retainer clip to said back surface of said backing panel, said laterally extending flange of said clip member being received in said locator slot and said hook formation having a groove which is adapted to receive the free end of said short flange extending forwardly from said side wall toward the picture in said picture frame, and said outer area surface being of sufficient areal extent of at least approximately 0.25 inches in width and 1 inch in length to provide support to said picture frame to inhibit distortion thereof while at the same time providing a retaining force to said backing panel.] *retainer clip adapted to be positioned between an inwardly extending flange at the back of a picture frame and backing material located within the frame behind a picture in the frame. The retainer clip includes a resilient body, structure on the body for engaging the inwardly extending flange at the rear edge of the picture frame and structure on the body for engaging the backing material. The structure for engaging the backing material includes at least one prong, detent or barb positioned to engage the backing material.*

BRIEF DESCRIPTION OF THE DRAWINGS

FIG. 1 is a rear perspective view of a picture frame assembly showing a picture frame, a sheet of backing material and a retainer clip constructed according to the teachings of the present invention.

FIG. 2 is a perspective view of a prior art retainer clip.

FIG. 3 is a side elevational view of the prior art retainer clip shown in FIG. 2.

DESCRIPTION OF THE PREFERRED EMBODIMENT(S)

Figure 7:
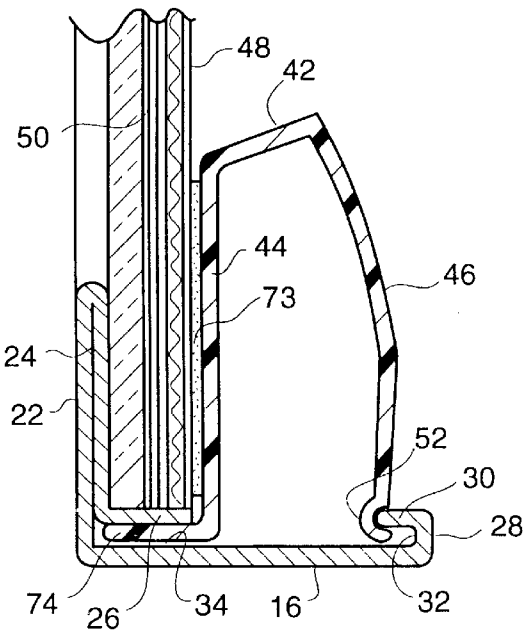
FIG. 7 is a fragmentary sectional view through a portion of the picture frame shown in FIG. 1 and through one of said retaining clips and is taken along lines 7—7 of FIG. 1.

Referring to FIG. 1, there is illustrated therein a picture frame assembly 10 including an extruded metal or plastic picture frame 12 constructed according to the teachings of the present invention and having a top wall portion 14, a bottom wall portion 16 and opposed side wall portions 18 and 20. As shown in FIG. 7, the picture frame 12 also includes a front border portion 22 which extends inwardly of the frame 12 from each of the top, bottom and side wall portions 14, 16, 18 and 20 a short distance and is then folded over so as to form an inner border portion or simply inturned wall portion 24 and then terminates in a rearwardly extending front flange 26 extending from the outer side edge of the inturned wall portion 24.

Also as shown, a rear edge 28 of the top wall portion 14, bottom wall portion 16 and side wall portions 18 and 20 is curled over to form a short flange 30 with a space 32 between the flange 30 and the wall portion, e.g. wall portion 16. Likewise, there is a space or locator slot 34 between the front flange 26 (extending rearwardly from the inturned wall portion 24) and the top, bottom or side wall portions 14, 16, 18, 20.

Returning to FIG. 1, it will be seen that a plurality of spring type metal or plastic retainer clips 40, or simply retainers 40, are provided which are generally U or V shaped in construction with a bight portion 42, an inner leg portion 44 and an outer leg portion 46. The inner leg portion 44 is adapted to bear against a sheet 48 of backing material positioned behind a picture 50 (FIG. 7) mounted in the picture frame 12 and the outer leg portion 46 has a hook formation 52 (FIG. 4) at the outer end thereof which is adapted to snap fittingly engage the short flange 30 at the rear edge 28 of one of the wall portions 14, 16, 18 or 20.

A prior art metal retainer clip 60 having the general construction described above is shown in FIGS. 2 and 3.

As shown, the [prior art] retainer clip 60 has a bight portion 62, an inner leg portion 64 and an outer leg portion 65. Here it will be seen that the outer leg portion [64] *65* has a hook formation 66 at an outer end thereof which is basically a deformation of the metal of the retainer clip 60 inwardly of the U shaped clip 60, outwardly from the bight of the U of the clip 60 and then laterally outwardly of the clip 60. Stated otherwise, the outer end of the outer leg portion [64] *65* is curled to form the hook formation 66.

The outer end of the inner leg portion 64 has a locator flange 68 extending laterally outwardly generally normal to the plane of the inner leg portion 64. It will be understood that this locator flange 68 is adapted to extend into the locator slot 34 between the wall portion 16 and the front flange 26 extending from the inturned wall portion 24. The curled hook formation 66 at the outer end of the outer leg portion 64 is adapted to snap fittingly engage the short flange 30 at the rear end of each wall portion 14, 16, 18, 20.

As shown in FIG. 3, the leg portions [62 and 64] *64 and 65* are both generally straight or planar and connect with the bight portion so as to initially have a V shape. Then, when the outer leg portion [64] *65* is deflected inwardly when mounting the retainer clip 60 to a picture frame 12, the inner leg portion [62] *64* will move away from the backing and assume an arcuate shape 70 as shown in phantom in FIG. 3.

Figure 5:
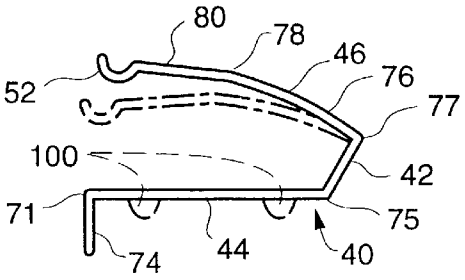
FIG. 5 is a side elevational view of the retainer clip of the present invention.
Figure 6:
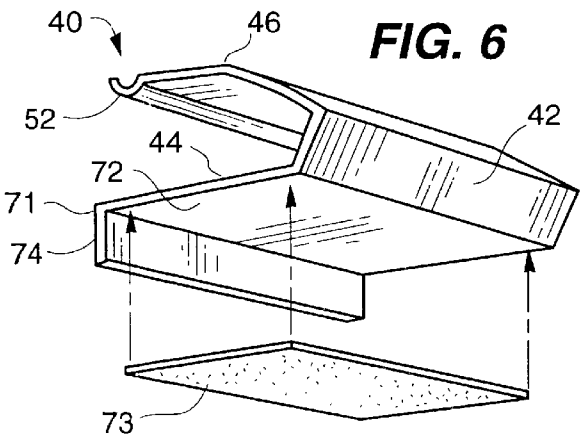
FIG. 6 is a bottom perspective view of the retainer clip of the present invention and shows the flat bottom surface of the clip to which an adhesive material is affixed.

The retainer 40 of the present invention, as shown in FIGS. 4–11, differs in several material respects from the retainer clip 60, as will be described now in greater detail. First of all, it will be seen that the inner leg portion 44 of the retainer clip 40 is completely flat or planar and has a significant length L which is greater than the width W of the inner leg portion 44 so as to provide a significant flat bottom surface 72 (FIG. 6) which is adapted to bear against the backing sheet 48 in the picture frame assembly 10. Then, in accordance with the teachings of the present invention, a layer of adhesive material 73 (FIGS. 6 and 7), preferably a piece of double-sided adhesive tape 73, is applied to the bottom surface 72 of the inner leg portion 42 as shown in FIG. 6 and is adhesively affixed to the backing sheet 48 in the picture frame assembly 10.

Figure 4:
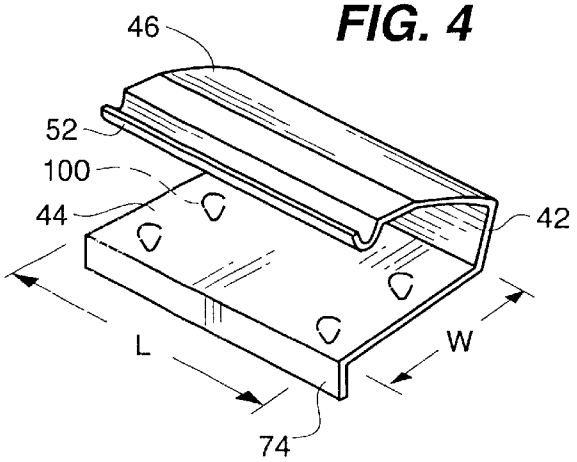
FIG. 4 is a top perspective view of the retainer clip constructed according to the teachings of the present invention.

The length and width dimensions of the surface 72 are shown as "L" for length and "W" for width in FIG. 4. The minimum workable dimensions are L≅1" and W≅0.25 inch. The preferred dimensions are L≅2" and W≅0.563". The length L and the width W can even be larger to provide a greater load bearing capability to each retainer 40. However, when the surface 72 is larger than L=2" and W=0.5625", it is hard to remove the retainer clip 40 and almost impossible to dislodge the retainer clip 40 once it is installed.

Next, it will be noted from FIGS. 4–11 that instead of a curved or rounded bight portion 62, the bight portion 42 of the retainer clip 40 is a straight wall which extends angularly outwardly from the plane of the inner leg portion 44 at an angle of approximately 85° and in a direction opposite the direction of a locator flange 74 (similar to locator 68 in the prior art clip 60).

In a manner similar to the prior art clip 60, the inner leg portion 44 of the retainer clip 40 of the present invention has a forward edge [73] *71* with the locator flange 74 extending laterally outwardly from the inner leg portion 44 generally normal to the inner leg portion 44 as best shown in FIGS. 5 and 7.

Figure 11:
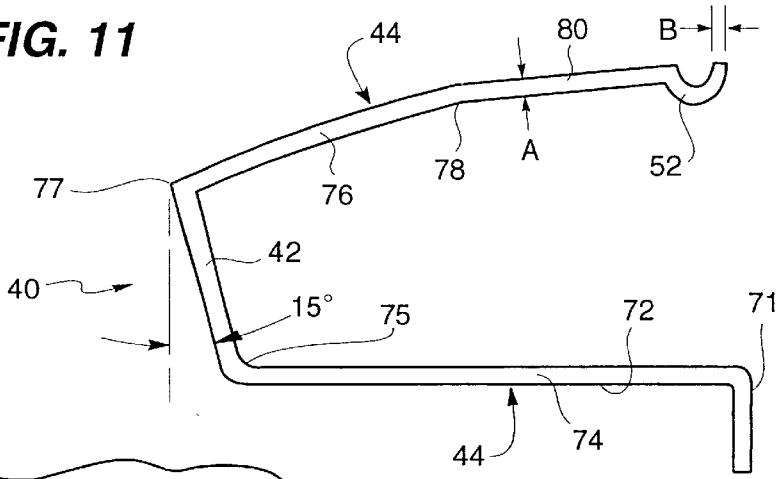
FIG. 11 is an enlarged side elevational view of the clip of the present invention illustrating various parameters of the clip.

The planar bight portion 42 extends from a crease or junction or bend line or edge 75 with the inner leg portion 44 outwardly at an angle of approximately 85°, (FIG. 11), from the plane of the inner leg portion 44, 15° to the vertical, and in a direction opposite the direction of the locator flange 74, as shown in FIGS. 5 and 11.

Then, the outer leg portion 46 of the retainer clip 40 includes a first inner, slightly curved portion 76 which extends laterally forwardly from a crease *or* junction or bend line or bend edge 77 at the upper edge of the bight portion 42 to a junction 78. From there, a flat outer portion 80 of the outer leg portion 46 extends forwardly from the junction 78 to the hook formation 52 or curled end portion 52 of the outer leg portion 46.

The inner leg portion 44, the bight portion 42 and the outer portion 80 of the outer leg portion 46 are all planar, or flat, as shown in the Figures.

Figure 9:
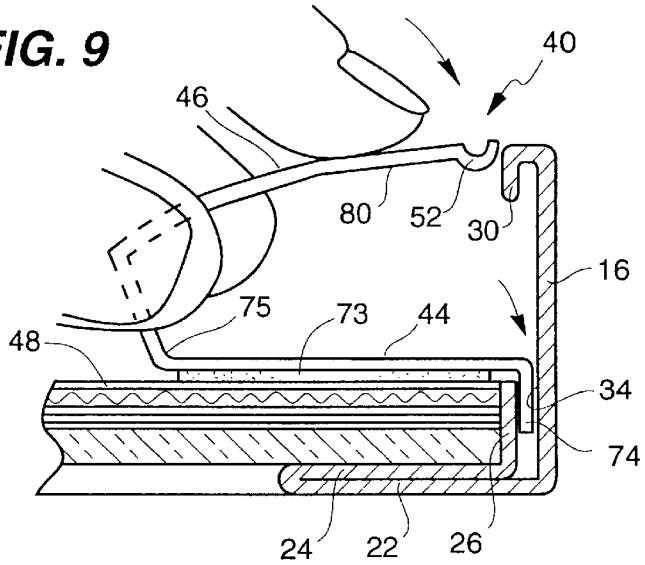
FIGS. 8, 9 and 10 show the manner in which a clip is inserted and mounted within a picture frame assembly.
Figure 8:
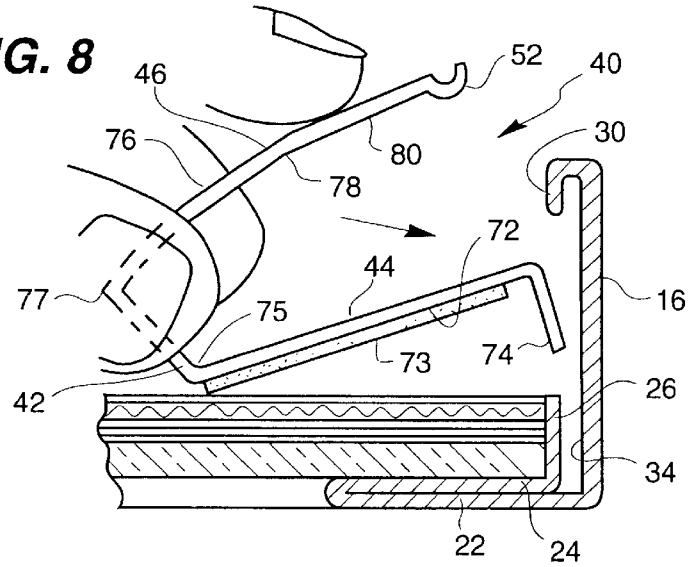
Figure 10:
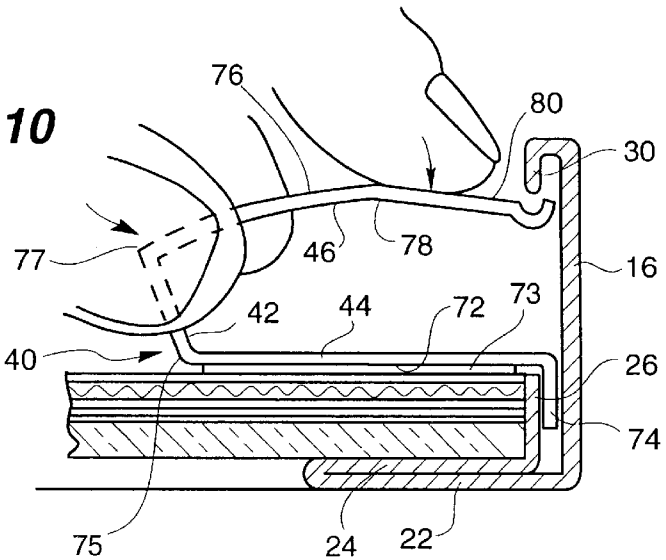

With this construction of the retainer clip 40 of the present invention and with reference to FIGS. 8, 9 and 10, it will be seen that the retainer clip 40 is first inserted into the back of the picture frame assembly 10 in the manner shown in FIG. 8 to place the locator flange 74 in the locator slot 34 between front flange 26 extending rearwardly from the inturned wall portion 24 and one of the top, side or bottom wall portions 14, 16, 18 or 20 of the picture frame 12. Then, as shown in FIG. 9, the wide bottom planar surface 72 of the inner leg portion 44 with adhesive 73 thereon is pressed against and adhered to the backing sheet 48.

Next, a finger is pressed against the outer surface of the outer portion 80 of the outer leg portion 46 to cause it to flex at the junctions 77 and 78 and about the junction 75, as shown in FIG. 10. This flexing action allows the hook formation 52 to be moved past the short flange 30 and then allowed to snap back to engage the short flange 30 while at the same time keeping surface 72 flush against the backing sheet 48.

This flexing action is achieved by reason of the curled construction of the outer leg portion 46 and the junctions 75, 77 and 78, as shown in FIG. 10.

Figure 12:
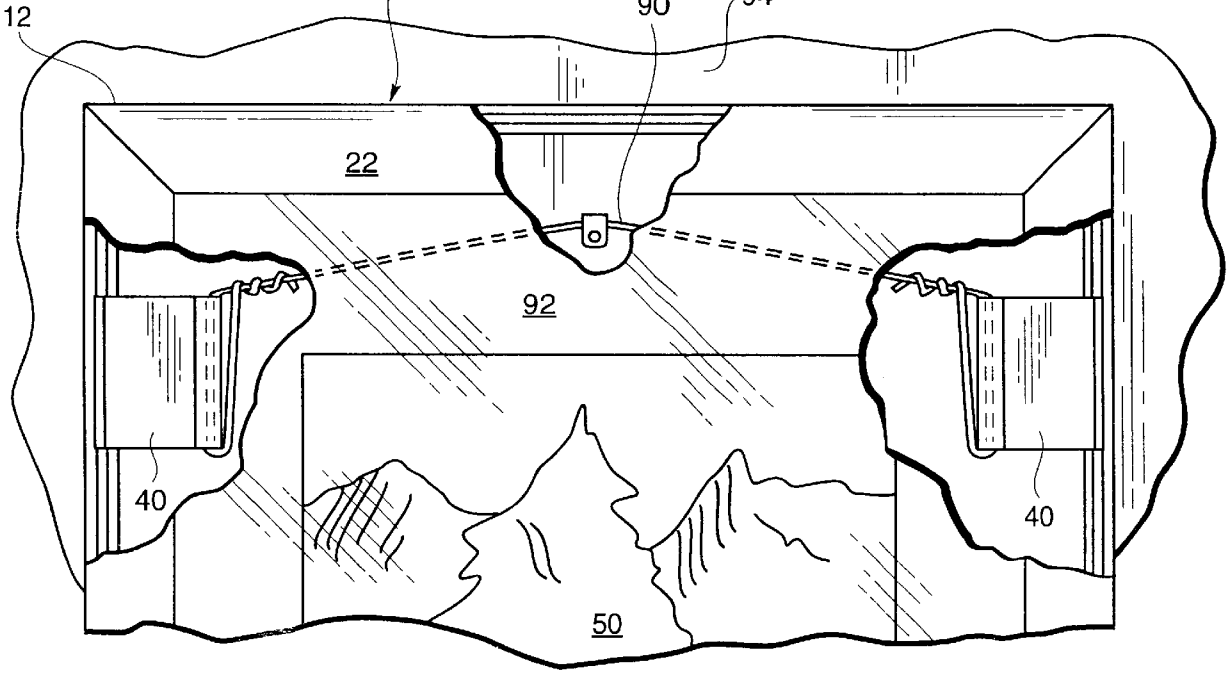
FIG. 12 is a fragmentary front elevational view of a picture frame assembly with portions broken away to show how a hang wire can be affixed to two retaining clips on opposite sides of the picture frame assembly for hanging the picture frame assembly on a wall.

As shown in FIGS. 1 and 12, two of the retaining clips 40 fixed to opposite side wall portions of the picture frame 12 can then have a hang wire 90 fixed thereto as shown in FIGS. 1 and 12 and which then permits the picture frame assembly 10 comprising the frame 10, the retainer 40, the backing 48, the picture 50 and a glass lens or cover 92 to be supported on a wall 94 as shown in FIG. 12. An alternate hanging method is to support the frame assembly 10 directly on two wall mounted nails spaced apart and engaging the frame 12.

It is important to note that with the significant bottom areal surface 72 of each of the retainer clips 40 firmly fixed to and/or flush against the back side of the backing sheet 48 for the picture 50 mounted in the picture frame 12, and with the locator flange 74 and hook formation 52 engaging the side wall portions 14, 16, 18, 20 of the frame assembly 12, the load or weight distribution imposed upon the hang wire 90 on two nails is carried not only by the frame 16 but also by the backing sheet 48 and picture 50 itself. This is very important, since this construction inhibits, if not altogether prevents, sagging of the picture frame 12 and distortion of either the top, bottom or side wall portions 14, 16, 18 and 20 of the picture frame 12.

Further according to the teachings of the present invention, the picture frame assembly shown in FIGS. 1, 8, 9, 10 and 12 includes a novel backing sheet 48 which is made of a very thin double faced corrugated board which has significant and substantial strength in all three dimensions of the backing sheet 48. The material from which the backing sheet 48 is made is sold under the name or mark MAXITE™ by B.C.I., Inc. of Chicago, Ill. As a result, the thin double faced corrugated backing sheet sustains and supports a substantial portion of the weight of the picture frame in conjunction with the retainer clips 40 adhered thereto.

From the foregoing description it will be apparent that the picture frame assembly 10 and retainer clips 40 used therein have a number of advantages, some of which have been described above and others of which are inherent in the invention.

The retainer design solves the frame deflection problem while at the same time providing a positive method of applying a retaining force to the frame components (glass, print, mat, backing, etc.).

The retainer is designed to "snap" into the frame profile and adhere to the frame backing panel which is "nested" within the frame rear profile locator and support channel. Permanent adhesion is provided by double sided tape of suitable shear strength situated between the backing panel and the retainer.

The retainer provides the following product design advantages:

- Provides positive (superior) pressure to frame components.
- Eliminates or minimizes profile "twist."
- Eliminates or minimizes profile "bow" and results in an effective "one piece" assembly and construction approach.
- Provides for the application of "belly bands" if desired.
- Provides for the use of wire hangers when attached to vertical retainers.
- Designed for the easy removal and replacement of the back with retainers permanently affixed.
- Designed to minimize "in transit" glass breakage due to superior glass retention.
- Eliminates costly "shrink wrap" requirement due to rigid construction.
- Minimizes "in store" damage due to increased product strength and stability.

Further, it will be apparent from the foregoing description that modifications can be made to the picture frame assembly 10 and retainer clip 40 without departing from the teachings of the present invention.

Although a presently preferred embodiment of the retainer clip 40 involves a retainer clip made of a plastic material, a modified embodiment is a retainer clip made of metal. Also such a metal clip 40 can have detentes 100, shown in dashed lines in FIG. 5, punched therefrom to form teeth or barbs 100 for engaging the backing sheet 48 in place of adhesive.

I claim:

1. A picture frame assembly including a picture frame and backing panel having a back surface mounted therein which picture frame has, in cross-section, a frame outer side wall, a turned in short flange at the rear end of the side wall extending forwardly to a free end, a frame outer front wall having a rearwardly extending flange extending generally parallel to the side wall and providing a forward locator slot between the rearwardly extending flange and the side wall, said frame assembly including two or more retainer members, each retainer member including a generally U or V shaped retainer clip having an inner linear planar leg portion having an outer areal surface adapted to abut and be adjacent to a portion of the back surface of said backing panel, and having a flange extending laterally outwardly therefrom, a bight portion extending from said inner leg portion at an angle thereto, and an outer leg portion which extends in a non-linear, non-planar manner to an outer end hook formation, and engaging means for grippingly engaging said outer areal surface of said inner leg portion of said retainer clip to said back surface of said backing panel, said laterally extending flange of said clip member being received in said locator slot and said hook formation having a groove which is adapted to receive the free end of said short flange extending forwardly from said side wall toward the picture in said picture frame, and said outer areal surface being of sufficient areal extent of at least approximately 0.25 inches in width and 1 inch in length to provide support to said picture frame to inhibit distortion thereof while at the same time providing a retaining force to said backing panel.

2. The picture frame assembly of claim 1 wherein said engaging means comprises a layer of adhesive material on said outer areal surface of said retainer clip inner leg portion such that said adhesive material, engages and adheres to the retainer and to the adjacent back surface of the backing panel.

3. The picture frame assembly of claim 1 wherein said backing panel comprises a thin double faced corrugated paper or plastic board sheet of material which has substantial transverse load carrying capabilities.

4. The picture frame assembly of claim 1 wherein said retainer clip is made of plastic.

5. The picture frame assembly of claim 1 wherein said retainer clip is made of metal.

6. The picture frame assembly of claim 1 wherein said inner planar leg portion has teeth forming detentes or barbs punched outwardly therefrom and forming said engaging means.

7. A picture frame assembly including a picture frame and backing panel having a back surface mounted therein which picture frame has, in cross-section, a side wall, a turned in flange at the rear end of the side wall extending forwardly to a free end, a rearwardly extending flange at the front end of the side wall providing a forward locator slot between the rearwardly extending flange and the side wall, said frame assembly including two or more retainer members, each retainer member including a generally U or V shaped retainer clip having an inner linear planar leg portion having an outer areal surface adapted to abut and be adjacent to a portion of the back surface of said backing panel, and having a flange extending laterally outwardly therefrom, a bight portion extending from said inner leg portion at an angle thereto, and an outer leg portion which extends in a non-linear, non-planar manner to an outer end hook formation, and engaging means for grippingly engaging said outer areal surface of said inner leg portion of said retainer clip to said back surface of said backing panel including at least one barb or tooth extending outwardly from said outer areal surface, said laterally extending flange of said clip member being received in said locator slot and said hook formation having a groove which is adapted to receive the free end of said short flange extending forwardly from said side wall toward the picture in said picture frame.

8. For use in a picture frame assembly including a picture frame, a retainer clip comprising a retainer body having a planar bight portion, an inner planar leg portion having a locator flange extending laterally outwardly therefrom connected to said planar bight portion and an outer leg portion, said planar bight portion extending at an angle from said planar inner leg portion, said planar inner leg portion having an outer areal surface adapted to abut and be adjacent to a portion of a back surface of a backing panel forming part of a picture frame assembly, said outer leg portion having a hook formation at the outer end thereof, and engaging means for grippingly engaging said outer areal surface of said inner leg portion of said retainer clip to the back surface of the backing panel.

9. For use in a picture frame assembly including a picture frame, a retainer clip comprising a retainer body having a planar bight portion, an inner planar leg portion having a locator flange extending laterally outwardly therefrom connected to said planar bight portion and an outer leg portion, said planar bight portion extending at an angle from said planar inner leg portion, said planar inner leg portion having an outer areal surface adapted to abut and be adjacent to a portion of a back surface of a backing panel forming part of a picture frame assembly, said outer leg portion having a hook formation at the outer end thereof, and engaging means for grippingly engaging said outer areal surface of said inner leg portion of said retainer clip to the back surface of the backing panel, said engaging means comprising an adhesive disposed between said outer areal surface and the back surface of the backing panel.

10. For use in a picture frame assembly including a picture frame, a retainer clip comprising a retainer body having a planar bight portion, an inner planar leg portion having a locator flange extending laterally outwardly therefrom connected to said planar bight portion and an outer leg portion, said planar bight portion extending at an angle from said planar inner leg portion, said planar inner leg portion having an outer areal surface adapted to abut and be adjacent to a portion of a back surface of a backing panel forming part of a picture frame assembly, said outer leg portion having a hook formation at the outer end thereof, and engaging means for grippingly engaging said outer areal surface of said inner leg portion of said retainer clip to the back surface of the backing panel, said engaging means comprising at least one barb or tooth extending outwardly from said outer areal surface for engaging the back surface of the backing panel.

11. The retainer clip of claim 10 wherein said engaging means comprises two spaced apart barbs or teeth extending outwardly from said outer areal surface.

*12. A frame assembly for receiving an object to be displayed comprising:*

*a frame which has a front side and a back side, which is adapted to extend around the object to be displayed, and which includes an outer side wall, a turned in front flange connected to said outer side wall, and a turned in back flange connected to said outer side wall opposite said front flange and having an inner edge facing said front flange;*

*a backing material located within said frame behind the object adapted to be displayed in said frame at said back side of said frame; and a retainer clip which is adapted to be positioned between said backing material and said inner edge of said back flange of said frame comprising:*

*a resilient body including:*

*a first portion having means for engaging said inner edge of said back flange; and*

*a second portion that faces said backing material for engaging said backing material;*

*said second portion of said body for engaging said backing material including at least one pointed prong that extends outwardly from said second portion of said body to engage said backing material.*

* * * * *